Figure 1:
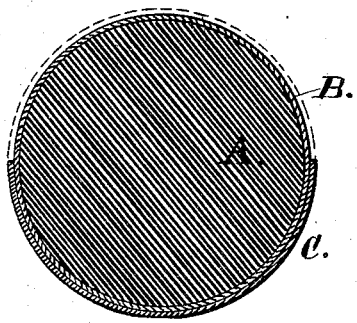

L. DIETZ, B. P. WAYNE, & A. STONE.
BILLIARD BALL.

No. 113,272. Patented Apr. 4, 1871.

Inventors.
Lewis Dietz
Benjamin P. Wayne
Alvan Stone

Witnesses.
G. W. Bader
John A. Brugan

United States Patent Office.

LEWIS DEITZ, BENJAMIN P. WAYNE, AND ALBERN STONE, OF ALBANY NEW YORK.

Letters Patent No. 113,272, dated April 4, 1871; antedated March 22, 1871.

IMPROVEMENT IN THE MANUFACTURE OF BILLIARD-BALLS AND OTHER COMPOSITION ARTICLES.

The Schedule referred to in these Letters Patent and making part of the same.

*To all whom it may concern:*

Be it known that we, LEWIS DEITZ, BENJAMIN P. WAYNE, and ALBERN STONE, of the city and county of Albany and State of New York, have invented a new and improved Method of Manufacturing Billiard-Balls, of which the following is a specification, reference being had to the annexed drawing, in which—

A is the composition-ball;
B is the coating of tin-foil; and
C is the outer or collodion coat.

To understand fully the nature and objects of our invention, it will be necessary to describe briefly the mode of constructing billiard-balls and other articles of various shapes, of a suitable molding-composition.

The molding-composition used is made by grinding paper to a very fine flock, or otherwise reducing any kind of fibrous, vegetable, animal, or mineral matter to a very fine state.

With paper-pulp or flock, or other finely-comminuted fibrous substance, is used gum shellac or any other solid, fusible, and adhesive gum, which is likewise reduced to a very fine powder.

This cement is thoroughly intermixed with the fibrous substance, both being in as dry a state as possible.

In the process of molding this composition, heat and pressure are applied simultaneously, the former to fuse the shellac used in the compound, to cause it to cement the small fibers together and form a solid homogeneous body, and the latter to compress and pack together the fibers throughout the mass, thus producing a very dense body.

The specific gravity of the billiard-balls or other articles made of the above-described composition may be increased by the addition of white lead or any other suitable pigment, which is added to the composition in a dry and pulverized state.

Whereas billiard-balls made of the above-described composition cannot be suitably colored, and are not capable of receiving and retaining a fine polish, and do not present the appearance of ivory, it became necessary to coat them with a substance that could be turned true and polished, and that might also be colored, as desired.

It was found that collodion was the best substance known for this purpose. It was also found, upon trial, that composition billiard-balls coated with collodion did not retain their shape and density; that they soon became useless on account of the affinity of the shellac in the composition and the alcohol in the collodion.

To prevent this destructive action from taking place, the softening of the shellac is the object of our invention.

We take the inner or composition-ball A and cover it with a coating of tin-foil or other metal. Said metal-foil is formed up into a suitable die or former, into a hemispherical shape. Two of these hemispheres make a complete coat or covering for the composition-ball A.

The ball A thus coated with the foil B is ready to receive its outer or collodion coat C, which is put on under pressure within a suitable mold.

The metallic coat B is thus interposed between the composition-ball A and its collodion coat C.

By the interposition of a metallic coat or lining, B, there can be no action of the alcohol or other solvent of the collodion upon the shellac or other adhesive gum used in the inner or composition-ball A.

Billiard-balls constructed with a tin-foil or metallic lining, B, interposed as herein shown and described, have proved to be in all respects superior to any composition or imitation of ivory balls heretofore known.

We do not confine ourselves in the use of the interposed lining or coat of tin-foil to billiard-balls, as it can be used with advantage on all articles similarly made.

The interposed lining B may be used between any composition containing adhesive gums that may be acted upon by the solvents used in the collodion.

We claim as our invention—

The coating or lining B, of tin-foil or other similar substance, between the composition-ball A and the collodion coating C of a billiard-ball, in the manner and for the purpose hereinbefore set forth.

LEWIS DEITZ.
BENJAMIN P. WAYNE.
ALBERN STONE.

Witnesses:
C. W. BRYDER,
JOHN A. BINGAM.